United States Patent [19]

Fischl et al.

[11] Patent Number: 5,403,203

[45] Date of Patent: Apr. 4, 1995

[54] CONTACT ARRAY

[75] Inventors: Steven R. Fischl, Coral Springs; Michael M. Austin, Pompano Beach; Wille Kottke, Miami; Adnan Aksoy, Boca Raton, all of Fla.

[73] Assignee: Motorola, Inc., Schaumburg, Ill.

[21] Appl. No.: 236,606

[22] Filed: May 2, 1994

[51] Int. Cl.6 ............................................. H04B 1/08
[52] U.S. Cl. ................................... 439/500; 439/620; 439/928
[58] Field of Search ............... 439/500, 928, 929, 660, 439/620, 62, 65

[56] References Cited

U.S. PATENT DOCUMENTS

| | | | |
|---|---|---|---|
| 5,007,859 | 4/1991 | Sangregory et al. | 439/500 X |
| 5,259,786 | 11/1993 | Huang | 439/500 X |
| 5,306,172 | 4/1994 | Inada et al. | 439/500 X |
| 5,320,561 | 6/1994 | Cook et al. | 439/500 X |

Primary Examiner—David L. Pirlot
Assistant Examiner—Daniel Wittels
Attorney, Agent, or Firm—Kenneth M. Massaroni

[57] ABSTRACT

A contact array (20) for electrically connecting an energy source (10) to a radio (35) and a charger (15), comprising a circuit assembly (40) having integral radio, charger, and circuit package contacts (52, 54, 56) extending from one end of the circuit assembly (40). Terminals (66) extend from a second end of the circuit assembly (40) for connecting to the energy source. A circuit package (60) is disposed adjacent the charger contacts (54) to electrically and mechanically support the contacts.

4 Claims, 2 Drawing Sheets

CONTACT ARRAY

CROSS REFERENCE TO RELATED APPLICATIONS

This application is related to U.S. application Ser. No. 08/143,025, filed Oct. 29, 1993, entitled "CONTACT ARRAY", by Adrian Aksoy, Mark Bresin, and Wille Kottke, and assigned to Motorola, Inc.

TECHNICAL FIELD

This invention relates generally to contact arrays and more specifically to a contact array for connecting an energy source to an electronic device and/or a charging device.

BACKGROUND OF THE INVENTION

Portable electronic devices such as two-way radios are typically comprised of a chargeable energy source that is connected to the electronic device and/or a charger by a contact array. The contact array comprises a flex assembly that includes a contact block and an insert molded part having both plastic and metal pieces. The flex assembly further includes terminals or tabs for connection to a battery cell pack. The tabs are shaped metal tabs which are spot-welded to the flex assembly. The contact block and tabs then must be flow or hand soldered onto a flex circuit. The flex assembly then has to be manually assembled into an electronic product. The typical flex assembly process is extremely labor intensive, is not conducive to automation, and hence is relatively expensive. The method of manufacture for a flex assembly is wrought with inefficient assembly procedures, and unnecessary parts and labor resulting in extensive manufacturing expense and compromised reliability.

The flex assembly may also include other components such as resistors, thermistors, diodes, connectors, and other components that enable a battery pack, for example, to be rechargeable and/or intrinsically safe. However, as the number of electrical parts used in an electronic device increases, the electrical integrity of the system and adequate electrical communication between the various parts becomes a concern. The drive to reduce weight in electronic consumer products is now impacting all parts of an electronic design. Automatic assembly as much as the drive to increase the ease of assembly and manufacturability demands that parts be integral and as compact as possible. The ability to integrate features and reduce components is critical in reducing the number of assembly steps. Moreover, to the extent possible, parts should be cooperatively fit with one another in order to enhance the strength and reliability of the parts.

Therefore, a need exists for a contact array which provides easy assembly, reduction in weight, and allows for greater efficiency and reduced cost in assembly and manufacture. Further, the contact array should be sufficiently ruggedized to maintain contact surface without deflection, and to reduce the occurrence of failure after assembly. Finally, there is a need for a simple, less expensive way to make a reliable connection between an energy source, an electronic device, and a charger.

DETAILED DESCRIPTION OF THE PREFERRED EMBODIMENT

Figure 1:
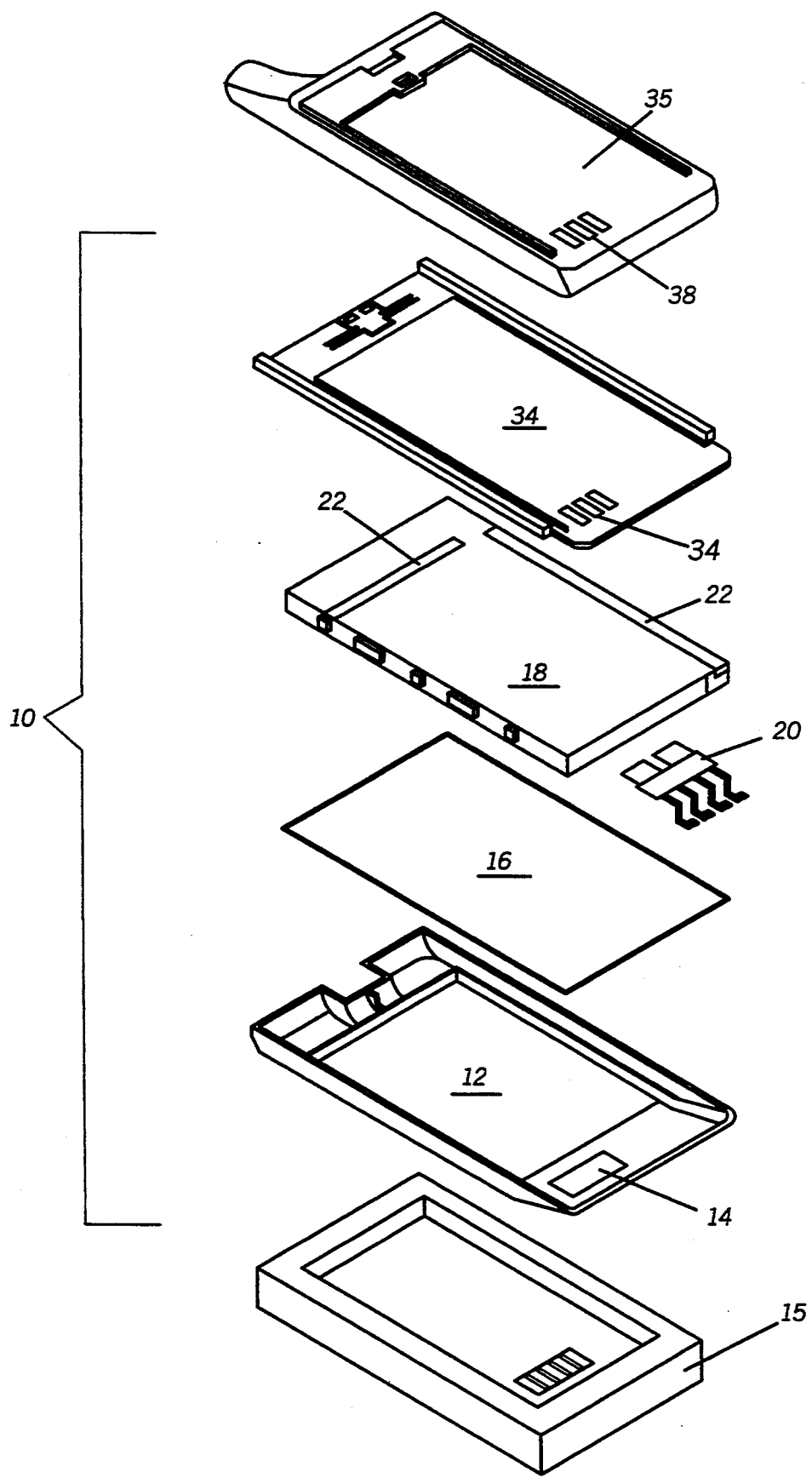
FIG. 1 is an exploded view of a battery assembly having an improved contact array in accordance with the present invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein an exploded view of a battery assembly having a contact array in accordance with the instant invention. The battery assembly (10) includes a bottom portion (12) having a battery charger interface (14) for allowing battery connection to a battery charger (15). A layer of adhesive material (16) may be used to secure a battery pack (18) to the bottom portion (12). A contact array (20) connects the battery cell pack (18) via terminal lines (22) to an electronic device (35) such as a radio as well as to the battery charger (15) when needed. A top portion (34) includes a battery radio interface (36) to allow the contact array (20) to access contacts on the radio (38). The top portion (34) meets with the bottom portion (12) enclosing the cell pack (18) and forming the battery assembly (10). The housing portions are preferably constructed to snap together. Alternatively, the housing portions could be ultrasonically welded together. The battery assembly (10) detachably couples with the radio.

Figure 2:
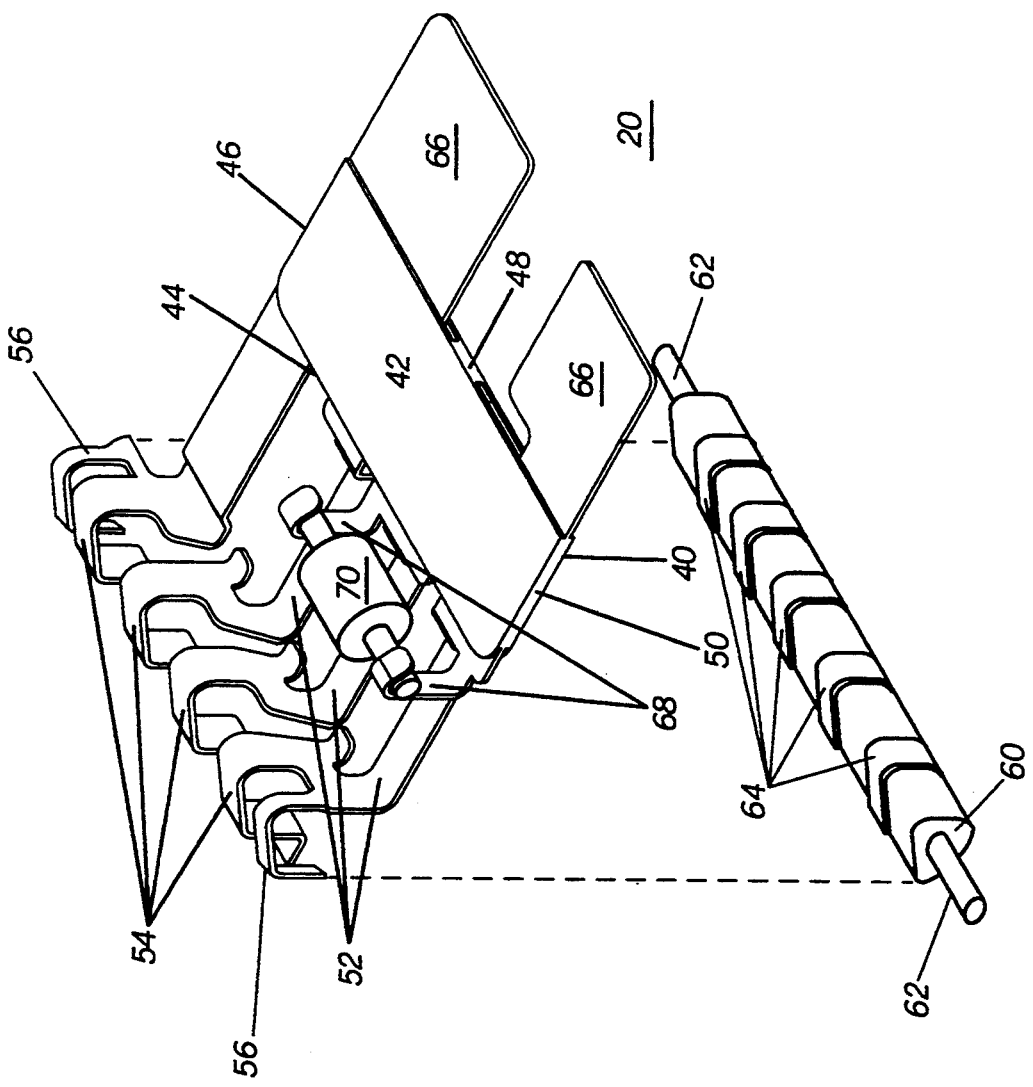
FIG. 2 is an isometric view of an improved contact array in accordance with the present invention.

Referring now to FIG. 2, there is illustrated therein an isometric view of the contact array (20) of FIG. 1. The contact array (20) is essentially a member for connecting the battery assembly (10) with the radio and/or the charger. The contact array (20) includes a circuit assembly (40) having a top side (42), and four ends (44), (46), (48), (50). The contact array (20) further includes a plurality of integral radio contacts (52), charger contacts (54), and circuit package contacts (56) extending from one end (44) of the circuit assembly (40). The radio contacts (52) are for connecting to contacts(38) on the radio (35) through the battery radio interface (36) on the top portion (34) of the battery assembly (10) illustrated in FIG. 1. The charger contacts (54) are for connecting to the charger (15) of FIG. 1 through the battery charger interface (14) on the bottom portion (12) of the battery assembly (10). The circuit package contacts (56) are for engaging a circuit package (60) adapted to engage the bottom side of charger contacts (54). More particularly, the circuit package contacts (56) are adapted to engage leads (62) extending horizontally from circuit package (60). The contacts (52), (54), and (56) are all electrically conductive electrical contacts.

The circuit package (60) is disposed beneath the charger contacts (54) offering several advantageous features not previously available. For example, the circuit package (60) allows for component placement in areas not typically considered conducive to standard component packages. Moreover, by placing the circuit package (60) under the charger contacts (54) one may replace support structures which may otherwise be necessary to strength and rigidize the charger contacts. Of course by eliminating the need for support structures, the overall weight and volume of a battery assembly (10) employing an improved contact array (20) is reduced.

The circuit package (60) may be, for example, a diode body, an EPROM body, or any other type of electric component necessary for use in a battery package. The circuit package (60) may be a custom-molded body support so as to fit conformally inside the charger contacts (54). The circuit package (60) may further include contacts (64) for electrically coupling the circuit package (60) to the charger contacts (54).

The contact array (20) may further include two integral terminals (66) extending from end (48) of circuit assembly (40). The terminals (66) are for connecting to terminal lines (22) of the battery assembly (10) of FIG. 1. The layer of adhesive (16) of FIG. 1 maybe placed over the terminals (66) to limit direct environmental interaction, particularly, for example, corrosive environments such as in marine use. Thus, the useful life of the battery assembly (10) may be prolonged.

The circuit assembly (40) may further include attachment means (68) extending from the circuit assembly (40) for attaching a second electronic component (70) to the top side of the circuit assembly (40). The attachment means (68) may be hooked extensions which allow a component, such as a thermistor, to be simply snapped and retained by the attachment means (68).

In summary, the instant invention provides an improved contact array which is easier to manufacture and assemble due to the lower number of parts, and resulting in lower overall costs. The improved circuit assembly further enhances reliability of the package by providing support structures under the charger contacts.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A contact array for electrically connecting an energy source to a radio and a charger comprising;
   a circuit assembly having a top and four sides;
   a plurality of integral radio and charger contacts extending from one end of said circuit assembly, said charger contacts having a top side and a bottom side;
   a circuit package having leads, and being sized and shaped to fit—conformally—adjacent said bottom side of said charger contacts;
   a plurality of integral circuit package contacts extending from said circuit assembly in the same direction as said radio and charger contacts, said circuit package contacts adapted to engage the leads of said circuit package;
   at least two terminals extending from a second end of said circuit assembly for connecting to the energy source; and
   integral means for attaching a component to the top side of said circuit assembly.

2. A contact array as in claim 1, wherein said means for attaching comprise a hook shaped extension which extends from said circuit assembly.

3. A contact array as in claim 1, wherein said circuit package further includes at least one contact for electrically coupling said circuit package to said charger contacts.

4. A contact array as in claim 1, wherein said at least two terminals comprise extension members that extend from a second end of said circuit assembly.

* * * * *